United States Patent [19]

Miyamoto et al.

[11] Patent Number: 5,857,123
[45] Date of Patent: Jan. 5, 1999

[54] CAMERA HAVING A MAGNETIC FLUX SHIELDING DEVICE

[75] Inventors: Hidenori Miyamoto, Urayasu; Tadashi Otani, Otawara, both of Japan

[73] Assignee: Nikon Corporation, Tokyo, Japan

[21] Appl. No.: 921,513

[22] Filed: Sep. 2, 1997

[30] Foreign Application Priority Data

Aug. 30, 1996 [JP] Japan .................................. 8-230130

[51] Int. Cl.⁶ .................................................. G03B 17/24
[52] U.S. Cl. ............................................................ 396/319
[58] Field of Search ..................................... 396/319, 320, 396/210

[56] References Cited

U.S. PATENT DOCUMENTS

5,701,531  12/1997  Tanaka et al. ........................... 396/319

*Primary Examiner*—W. B. Perkey

[57] ABSTRACT

A camera having a shielding device to prevent leaked magnetic flux generated by a drive motor from affecting magnetic information recorded on film in a camera in which a drive motor is provided within a winding spool. The shielding device includes an inner shielding member and an outer shielding member which shield magnetic flux from the drive motor, even if the intensity of the magnetic flux leaked from the motor fluctuates. The outer shielding member is made of permalloy B with a high maximum relative permeability, and is provided outside of a motor housing case for the drive motor. The motor housing case forms the inner shielding member, and is made of pure iron having a high saturated magnetic flux density. The leaked magnetic fluxes generated by the drive motor having a strong magnetic field intensity are shielded by the motor housing case while other leaked magnetic flux having a weak magnetic field intensity is shielded by the outer shielding member.

19 Claims, 6 Drawing Sheets

FIG. 6

CAMERA HAVING A MAGNETIC FLUX SHIELDING DEVICE

CROSS-REFERENCE TO RELATED APPLICATIONS

This application is based upon and claims priority of Japanese Patent Application No. 08-230130 filed Aug. 30, 1996, the contents of which are incorporated herein by reference.

BACKGROUND OF THE INVENTION

1. Field of the Invention

The present invention relates to a camera including a recording and playback device to record magnetic information on a magnetically recordable film and to play back the recorded information, and, more particularly, the present invention relates to a camera having a shielding member to shield a magnetically recordable film from magnetic flux generated by a drive motor.

2. Description of the Related Art

Cameras are known which are capable of recording photographic information for each film frame, such as a date of photography or an exposure value, on a magnetically recordable medium which is applied on the film. The photographic information recorded on the magnetically recordable medium applied on the film is read at a photography laboratory and the recorded information is printed on the back side of the prints.

In the known type of camera, the film is fed by driving a film winding spool with a drive motor placed inside the film winding spool. When a magnetically recordable film is used in the known camera having a drive motor inside the film winding spool, the recorded magnetic information may be damaged by magnetic flux leaked from the brush side of the drive motor, or playback may be hindered as a result of regenerated noise caused by the leaked magnetic flux. To prevent the magnetic flux from leaking from the film winding spool, a camera having a magnetic shield applied to the winding spool has been proposed. For example, Japanese Laid-Open Patent Publication No. H4-26832 discloses such a camera. Further, a camera having a permalloy material, or layers of permalloy material, used as a magnetic shield to reduce the magnetic noise from the motor has been proposed. For example, Japanese Laid-Open Patent Publication No. H5-34798 discloses this type of camera. The methods described in Japanese Laid-Open Patent Publications Nos. H4-26832 and H5-34798 enable a leaked magnetic flux of a certain intensity to be shielded according to the BH characteristics and relative permeability of the shielding member.

However, with the shielding devices described in the above-noted Japanese Laid-Open Patent Publications it is possible to shield only the leaked magnetic flux having a certain intensity that is particular to the shielding member. More particularly, the intensity of the leaked magnetic flux from the motor changes according to the rotation of the motor between a minute magnetic field intensity and a high magnetic field intensity with a certain frequency. Thus, it is not possible to effectively shield the leaked magnetic flux with a thin shielding member if the magnetic field intensity periodically fluctuates.

SUMMARY OF THE INVENTION

It is an object of the present invention to provide a magnetic flux shielding device, suitable for use in a camera film forwarding system, to effectively shield magnetic flux leaked from a drive motor in a film winding spool, even if the intensity of the magnetic flux leaked from the motor fluctuates.

Objects and advantages of the present invention are achieved in accordance with a first embodiment of the present invention with a camera including a cartridge chamber to load a film cartridge which accommodates a magnetically recordable film; a winding spool to wind the film; a drive motor within the winding spool to drive the winding spool; a magnetic information reading device to read the magnetic information recorded on the film; an inner shielding member formed on a same shaft as a rotation shaft of the drive motor to shield the leaked magnetic flux from the drive motor; and an outer shielding member also formed on the same shaft as the rotation shaft of the drive motor to shield the leaked magnetic flux from the drive motor. The inner shielding member comprises a material having a saturated magnetic flux density greater than the saturated magnetic flux density of the outer shielding member, and the outer shielding member comprises a material having a maximum relative permeability greater than the maximum relative permeability of the inner shielding member. Further, the inner shielding member and the outer shielding member are connected to a ground potential.

In accordance with the first embodiment of the present invention, the inner shielding member comprises a housing case for the drive motor, and the outer shielding member comprises a shielding member made of permalloy B or permalloy C.

In accordance with the first embodiment of the present invention, the inner shielding member comprises a housing case for the drive motor, and the outer shielding member comprises a first shielding member and a second shielding member provided outside of the first shielding member. The maximum relative permeability of the second shielding member is greater than the maximum relative permeability of the first shielding member, and the first shielding member and the second shielding member are connected to the ground potential.

In accordance with another embodiment of the present invention, the first shielding member is positioned inside of the winding spool, while the second shielding member is positioned outside of the winding spool.

Objects and advantages of the present invention are achieved in accordance with a second embodiment of the invention with a camera including a cartridge chamber to load a film cartridge which accommodates magnetically recordable film; a winding spool to wind the film; a drive motor provided within the winding spool to drive the winding spool; a magnetic information reading device to read the magnetic information recorded on the film; an inner shielding member provided on a same shaft as a rotation shaft of the drive motor to shield leaked magnetic flux from the drive motor; and an outer shielding member provided on the same shaft with a rotation shaft of the drive motor to shield leaked magnetic flux from the drive motor. The inner shielding member is made of a material having a saturated magnetic flux density under a high intensity magnetic field which is greater than the saturated magnetic flux density of the outer shielding member under a high intensity magnetic field. The outer shielding member is made of a material having a saturated magnetic flux density under a low magnetic field intensity greater than a saturated magnetic flux density of the inner shielding member under a low magnetic field intensity. Further, the inner shielding member and the outer shielding member are connected to a ground potential.

In accordance with the second embodiment of the present invention, the inner shielding member comprises a housing case for the drive motor, and the outer shielding member comprises a first shielding member and as a second shielding member provided outside of the first shielding member. The saturated magnetic flux density of the second shielding member under a low magnetic field intensity is greater than the saturated magnetic flux density of the first shielding member under a low magnetic field intensity, and the first shielding member and the second shielding member are connected to a ground potential.

The material with a high saturated magnetic flux density under a high magnetic field intensity can shield, in a high density field, the magnetic flux with a strong magnetic field intensity; however, the material having a high saturated magnetic flux density under a high magnetic field intensity cannot shield the magnetic flux with a weak magnetic field intensity. On the other hand, the material with a high maximum relative permeability can shield the magnetic flux with a weak magnetic field intensity that cannot be shielded by a material with a high saturated magnetic field density under a high magnetic field intensity since it has a high saturated magnetic flux density under a low magnetic field intensity.

According to the first embodiment of the present invention, the inner shielding member having a greater saturated magnetic flux density shields a magnetic flux having a strong magnetic field intensity among the magnetic fluxes leaked from the drive motor in a high density field, while the outer shielding member shields a magnetic flux with a weak magnetic field intensity. The magnetic flux leaked from drive motor is thereby shielded if the intensity of the magnetic field periodically fluctuates. Furthermore, since the inner shielding member and outer shielding member are connected to a ground potential, the magnetic noise captured by each shielding member is effectively dissipated.

Further, since the inner shielding member may comprise a housing case for the drive motor, the configuration of the shielding member is simplified.

In accordance with the second embodiment of the present invention, since the outer shielding member comprises the first shielding member and the second shielding member, the second shielding member, which has a greater saturated magnetic flux density, shields the magnetic flux of a weak magnetic field intensity that cannot be shielded by the first shielding member from among the leaked magnetic fluxes that cannot be shielded by the inner shielding member. Thus, magnetic flux leaked from the drive motor can be shielded regardless of the intensity of the magnetic field. Moreover, since the first shielding member and the second shielding member are connected to a ground potential, the magnetic noise captured by each shielding member can be effectively dissipated.

Further, since the first shielding member is provided inside of the winding spool and the second shielding member is provided outside of the winding spool, the configuration of the shielding members is simplified.

In accordance with the second embodiment of the present invention, the magnetic flux with a strong magnetic field intensity from among the magnetic flux leaked from the drive motor is shielded, in a high density field, by the inner shielding member having a greater saturated magnetic flux density under a high magnetic field intensity, while the magnetic flux with a weak magnetic field intensity is shielded by the outer shielding member having a greater saturated magnetic flux density under a low magnetic field intensity, thereby shielding the magnetic flux leaked from the drive motor when the intensity of the magnetic field periodically fluctuates. Moreover, since the inner shielding member and the outer shielding member are connected to a ground potential, the magnetic noise captured by each shielding member can be effectively dissipated.

In accordance with embodiments of the invention, since the outer shielding member comprises a first shielding member and a second shielding member, the second shielding member having a greater saturated magnetic flux density under a low magnetic field intensity shields the magnetic flux with a weak magnetic field intensity that cannot be shielded by the first shielding member from among the leaked magnetic fluxes that cannot be shielded by inner shielding member. Thus, the magnetic flux leaked from the drive motor can be shielded regardless of the intensity of the magnetic field. Moreover, since the first shielding member and the second shielding member are connected to a ground potential, the magnetic noise captured by each shielding member can be effectively dissipated.

DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1:
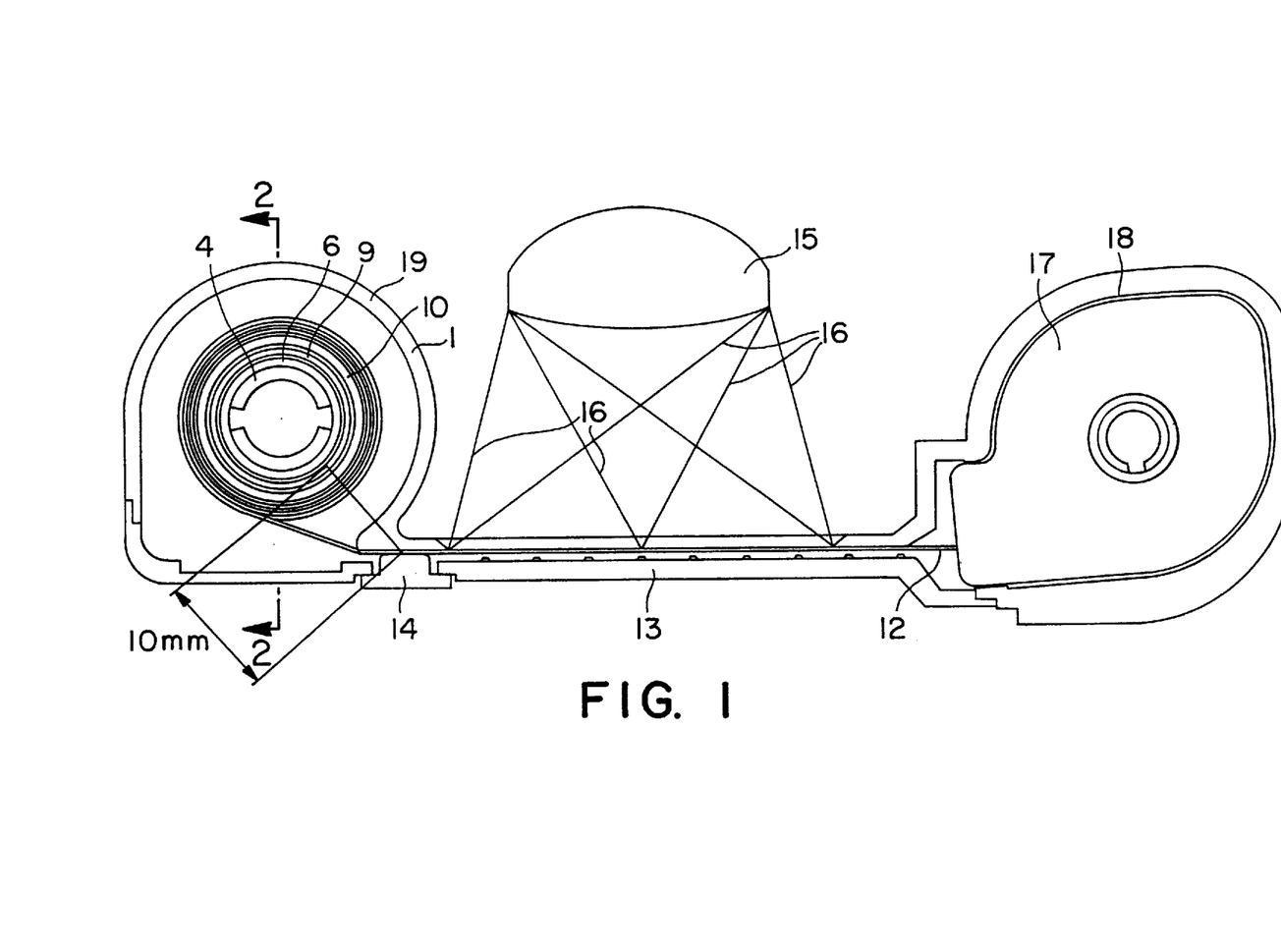
FIG. 1 is a horizontal cross sectional view of a camera in accordance with a first embodiment of the present invention.

A first embodiment of the present invention will now be described below with reference to FIGS. 1 and 2. FIG. 1 is a horizontal cross-sectional view of a camera in accordance with the first embodiment of the present invention, and FIG. 2 is a vertical cross-sectional view of the camera, taken along the 2—2 line in FIG. 1, and illustrating a configuration of the winding spool in accordance with the first embodiment of the present invention.

Figure 2:
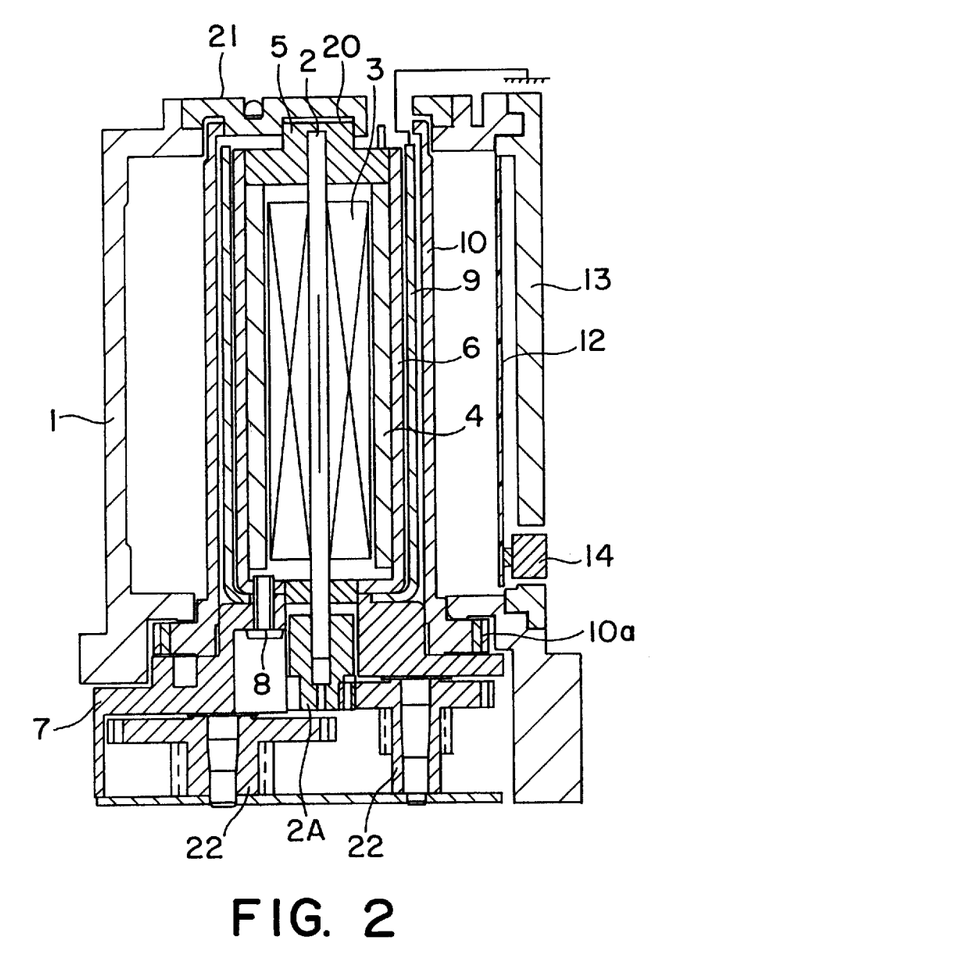
FIG. 2 is a cross-sectional view taken along the 2—2 line of FIG. 1 showing a winding spool in accordance with embodiments of the present invention.

As shown in FIGS. 1 and 2, a camera body 1 includes a cartridge chamber 18 into which a film cartridge 17 is loaded. The film cartridge 17 accommodates film 12 that includes an area to magnetically record magnetic data. A spool chamber 19 accommodates a winding spool 10 to wind the film 12 which extends from the film cartridge 17. A photographic lens 15 and a pressure plate 13 to retain the film 12 in a designated position are provided between the spool chamber 19 and the cartridge chamber 18. The photographic lens 15 produces photographic luminous flux 16 to form an image on the film 12 retained by the pressure plate 13. A magnetic head 14 is provided to read the magnetic information recorded on the film 12 and to write magnetic information on the film 12. The magnetic head 14 is preferably positioned between the pressure plate 13 and spool chamber 19 on the pressure plate side of the film 12. Further, the magnetic head 14 may comprise separate reading and writing heads, with the reading head positioned on the spool side.

As shown in FIG. 2, a drive motor 20 is positioned inside of the winding spool 10. The drive motor 20 includes a motor rotation shaft 2, a motor core 3 and a motor magnet 4 accommodated inside of a motor housing case 6. The motor housing case 6 forms an inner shielding member, as will be described in detail hereinafter. A lid 5 provided above the motor housing case 6 secures a motor commutator (not shown) and a terminal (not shown). The drive motor 20 is secured to the camera body 1 by a holding lid 21 through lid 5. A pinion gear 2A is provided on an end of the motor rotation shaft 2. The pinion gear 2A is engaged with a gear 10a formed on the winding spool 10 through a reduction gear train 22 accommodated in a resin formed gear platform 7. Accordingly, when the drive motor 20 is driven to rotate the motor rotation shaft 2, the winding spool rotates.

Moreover, a shielding member 9 is provided outside of the motor housing case 6 and has a minute clearance from the motor housing case 6. A distance range of the minute clearance between the shielding member 9 and the motor housing case 6 is, for example, 0.2 mm–0.3 mm. However, the clearance between the shielding member 9 and the motor housing case 6 is not limited to the above range. The clearance between the shielding member 9 and the motor housing case 6 should be selected as a clearance which prevents the motor housing case 6 from touching the shielding member 9 due to vibration of the rotating motor within the motor housing case 6. Thus, the preferred clearance is determined such that the motor housing case 6 does not touch the shielding member 9 when the motor rotates. The shielding member 9 extends to the output shaft side of the motor housing case 6, and is secured to the gear platform 7, along with the motor housing case 6, via a screw 8. The shielding member 9 is connected to the ground potential.

The motor housing case 6 is preferably made of pure iron which has been annealed at approximately 820° C., and preferably has a thickness in a range from 0.3 to 0.6 millimeters (mm). The shielding member 9 is preferably made of a permalloy material B (PB material) which has been annealed at 1200° C. and has a relatively low Ni content, and preferably has a thickness in a range of from 0.3 to 0.4 mm.

Figure 3:
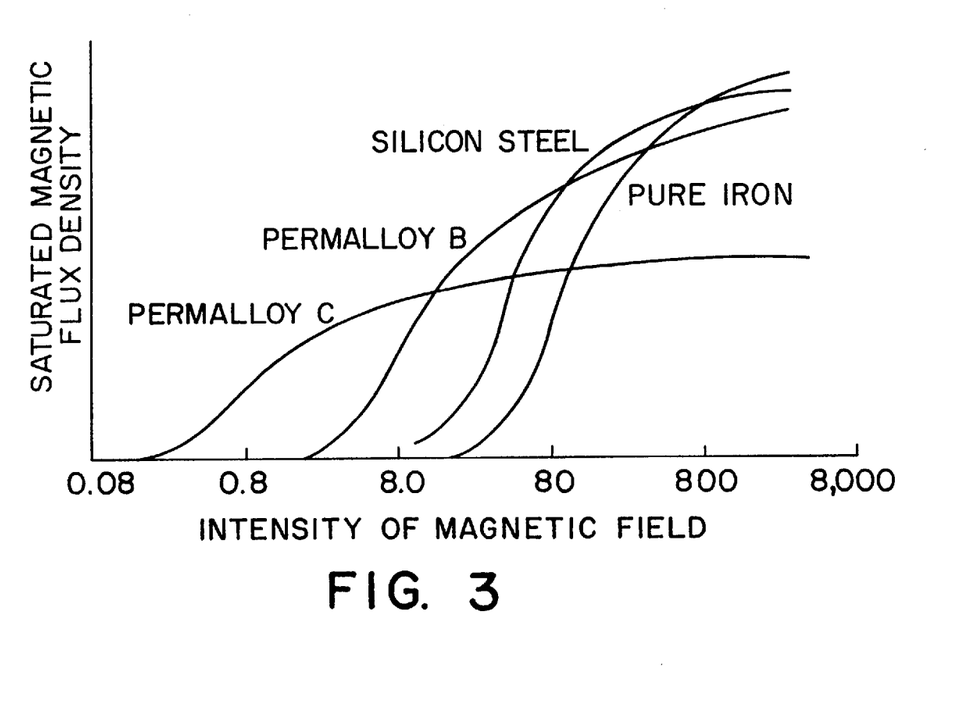
FIG. 3 is a graph showing the BH characteristics of various shielding members in accordance with embodiments of the present invention.

FIG. 3 is a graph showing a BH curve for various shielding member materials in accordance with embodiments of the present invention. Table 1 below illustrates the relationship between composition, maximum relative permeability, saturated magnetic flux density, coercive force, and density for each shielding member material. As shown in FIG. 3 and Table 1, with respect to the BH characteristics, the materials which exhibit high saturated magnetic flux density under a high magnetic field intensity, such as the steel plate, pure iron, and silicon steel, can shield, in a high density field, the magnetic flux having a strong magnetic field intensity under a high magnetic field intensity. However, these materials having high saturated magnetic flux density under a high magnetic field intensity cannot shield the magnetic flux with a weak magnetic field intensity under a low magnetic field intensity.

On the other hand, materials with a high maximum relative permeability, such as permalloy B and permalloy C, have a relatively high saturated magnetic flux density under a low magnetic field intensity. The materials with a relatively high maximum relative permeability and relatively high saturated magnetic flux density under a low magnetic field intensity can shield the magnetic flux having a weak magnetic field intensity without the use of thick materials. Nevertheless, it is not possible to adequately shield the magnetic flux under a strong magnetic field with the materials having a relatively high maximum relative permeability since they have a low saturated magnetic flux density under a high magnetic field intensity. More specifically, as shown in Table 1 and FIG. 3, the higher the maximum relative permeability, the higher the saturated magnetic flux density under a low magnetic field intensity.

For the above reasons, in accordance with the first embodiment of the present invention, the motor housing case 6 is preferably made of pure iron having a high saturated magnetic flux density under high magnetic field intensity to shield the leaked magnetic flux having a strong magnetic field intensity. The shielding member 9 is preferably made of permalloy B having a higher maximum relative permeability than pure iron, and positioned outside of the motor housing case 6 to shield the leaked magnetic flux with a weak magnetic field intensity. Thus, in accordance with the present invention, both leaked magnetic flux with a strong magnetic field intensity and leaked magnetic flux with a weak magnetic field intensity are shielded with the use of relatively thin materials. Further, in accordance with the present invention, the magnetic data recorded on the film 12 is accurately read without the film being affected by the magnetic flux leaked from the drive motor 20, even when the drive motor 20 and the magnetic head 14 are closely positioned.

For example, as shown in FIG. 1, when the distance between the magnetic head 14 and the motor housing case 6 is 10 mm, it is still possible to greatly reduce the level of magnetic noise in the magnetic information read by the magnetic head 14 caused by the leaked magnetic flux. Moreover, since the shielding member 9 extends to the output shaft side of the motor housing case 6, the shielding member 9 shields the leaked magnetic flux generated in an area near the output shaft side of the drive motor 20. Further, there is no necessity to place the magnetic head 14 away from the drive motor 20, thereby increasing the freedom in designing the camera as well as reducing the size of the camera. Furthermore, since the motor housing case 6 and the shielding member 9 are connected to the ground potential, the leaked magnetic flux is shielded more effectively. Furthermore, by securing the shielding member 9 and the motor housing case 6 as a unit, the generation of induction noise caused by relative vibration is prevented even if the drive motor 20 vibrates.

permalloy C, has an even higher saturated magnetic flux density under low magnetic field intensity, and is provided to shield the leaked magnetic flux with a weaker magnetic field intensity.

As a result of the above-described structure, in accordance with the second embodiment of the present invention, both leaked magnetic flux with a strong magnetic field intensity and leaked magnetic flux with a weak magnetic field inten-

TABLE 1

| NAME | COMPOSITION | PROCESS | MAX RELATIVE PERMEABILITY | MAGNETIC SATURATION (T) | COERCIVE FORCE $H_c(A/m)$ | DENSITY $g \times cm^{-3}$ |
|---|---|---|---|---|---|---|
| Steel Plate | SS400 |  | 2,100 | 2.3 | 80.0 | 7.85 |
| " | " | 620° C. | 3,100 | 2.3 | 80.0 | 7.85 |
| Pure Iron | Impurity <0.5% |  | 3,400 | 2.3 | 53.0 | 7.88 |
| " | " | 820° C. | 12,500 | 2.3 | 80.0 | 7.88 |
| Silicon Steel Plate | Non-directional 4Si | 800° C. | 4,600 | 2.11 | 120.0 | 7.65 |
| Silicon Steel Plate | Directional 3Si | 800° C. | 67,350 | 2.03 | 4.6 | 7.60 |
| Permalloy B | 45 Ni | 1200° C. $H_2$ | 60,000 | 1.5 | 6.4 | 8.55 |
| Permalloy C | 78 Ni | 1100° C. $H_2$ | 250,000 | 0.87 | 12.0 | 8.72 |

In accordance with the first embodiment of the present invention described above, permalloy B is used as the shielding member 9; however, other materials may be used as the shielding member 9, such as permalloy C. By using permalloy C, leaked magnetic flux with a weaker magnetic field intensity is shielded.

Figure 4:
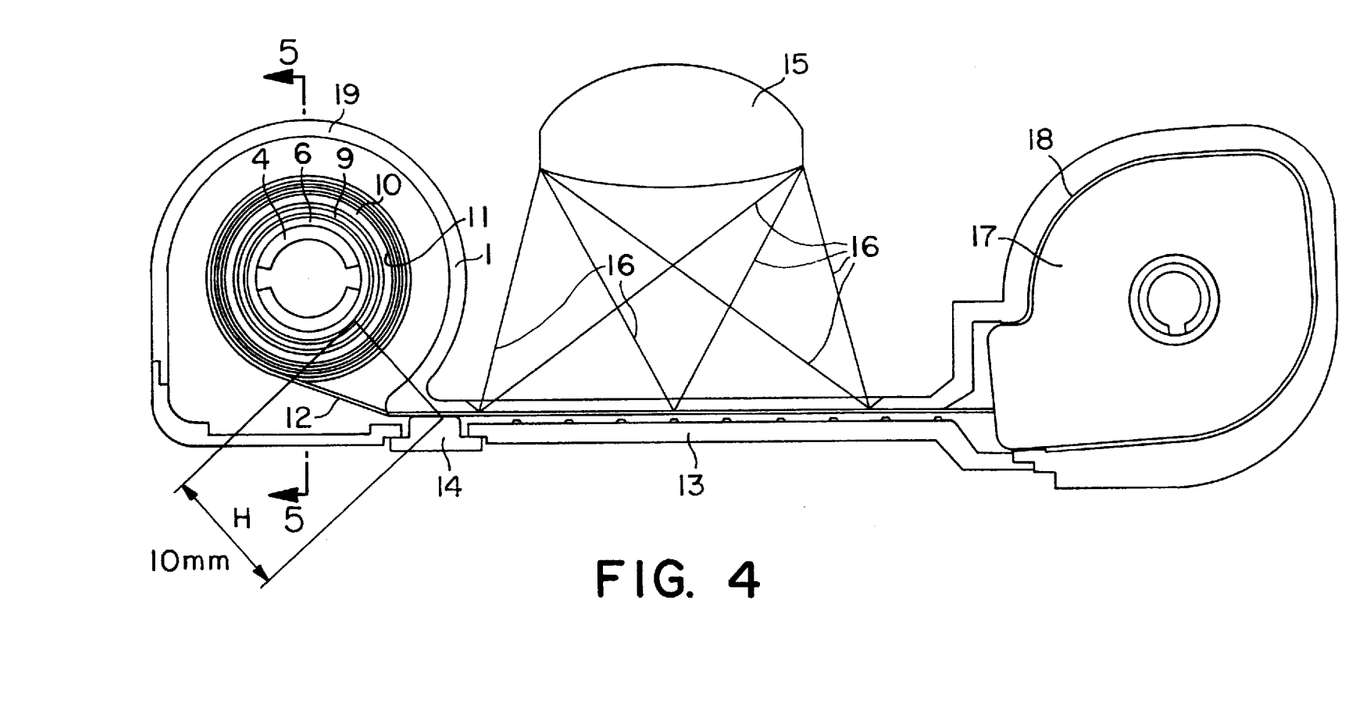
FIG. 4 is a horizontal cross sectional view of a camera in accordance with a second embodiment of the present invention.
Figure 5:
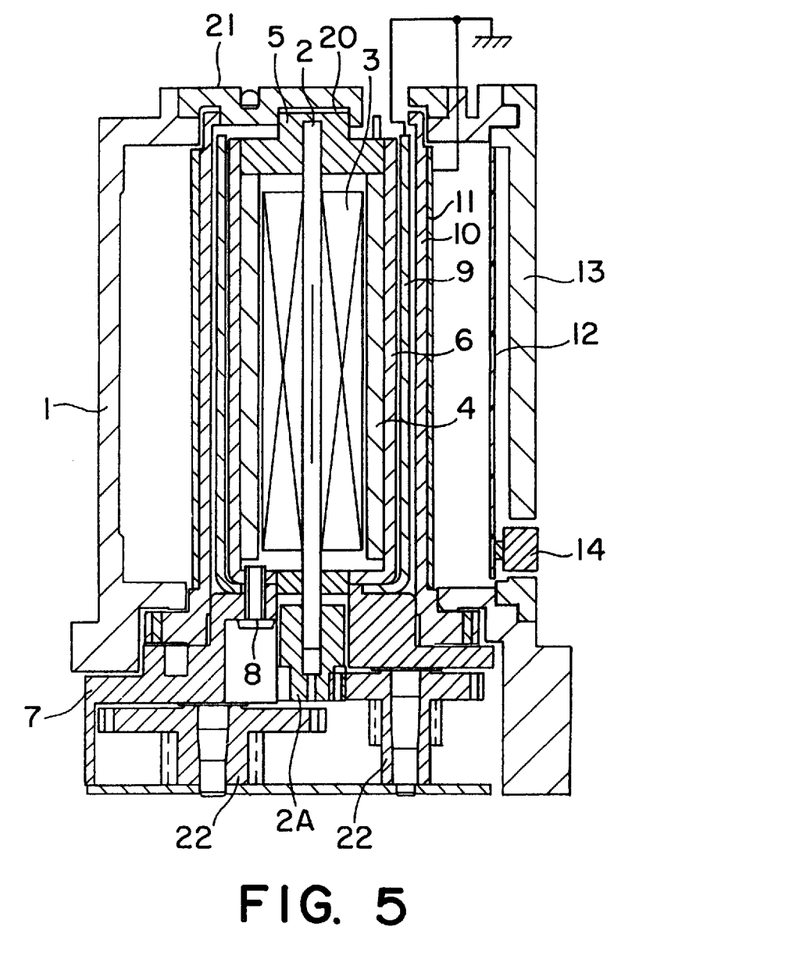
FIG. 5 is a cross-sectional view taken along the 5—5 line of FIG. 4 showing a winding spool in accordance with embodiments of the present invention.

A second embodiment of the present invention will now be described below with reference to FIGS. 4 and 5. FIG. 4 is a horizontal cross-sectional view of a camera in accordance with the second embodiment of the present invention, and FIG. 5 is a cross-sectional view taken along the 5—5 line in FIG. 4 of the winding spool in accordance with the second embodiment of the present invention. In FIGS. 4 and 5, elements which are the same as or similar to those shown in FIGS. 1 and 2 are referred to by like reference numerals, and a detailed description of these like elements is omitted here.

The second embodiment of the present invention differs from the first embodiment in that in addition to the shielding member 9, a shielding member 11 is provided outside of the winding spool 10. In accordance with the second embodiment of the present invention, an explanation will be provided below by referring to the shielding member 9 as the first shielding member and to the shielding member 11 as the second shielding member. Both the first shielding member 9 and the second shielding member 11 are connected to the ground potential. The second shielding member 11 is preferably made of permalloy C material (PC material) that has been annealed at approximately 1100° C. with a relatively high Ni content, and having a thickness in a range of from 0.3 to 0.4 mm.

In accordance with the second embodiment of the present invention, the motor housing case 6 is preferably made of pure iron having a high saturated magnetic flux density under a high magnetic field intensity to shield the leaked magnetic flux having a strong magnetic field intensity. The first shielding member 9 is positioned outside of the motor housing case 6, and is preferably made of permalloy B having a higher maximum relative permeability than pure iron to shield the leaked magnetic flux with a weak magnetic field intensity. Moreover, the second shielding member 11 outside of the first shielding member 9, which is made of sity can be more effectively shielded. Thus, the magnetic data recorded on the film 12 can be more accurately read because it is not affected by the magnetic flux leaked from the drive motor 20, even when the drive motor 20 and the magnetic head 14 are closely positioned. Further, since it is no longer required to place the magnetic head 14 away from the drive motor 20, the freedom in designing the camera is increased and the size of the camera can be reduced.

Figure 6:
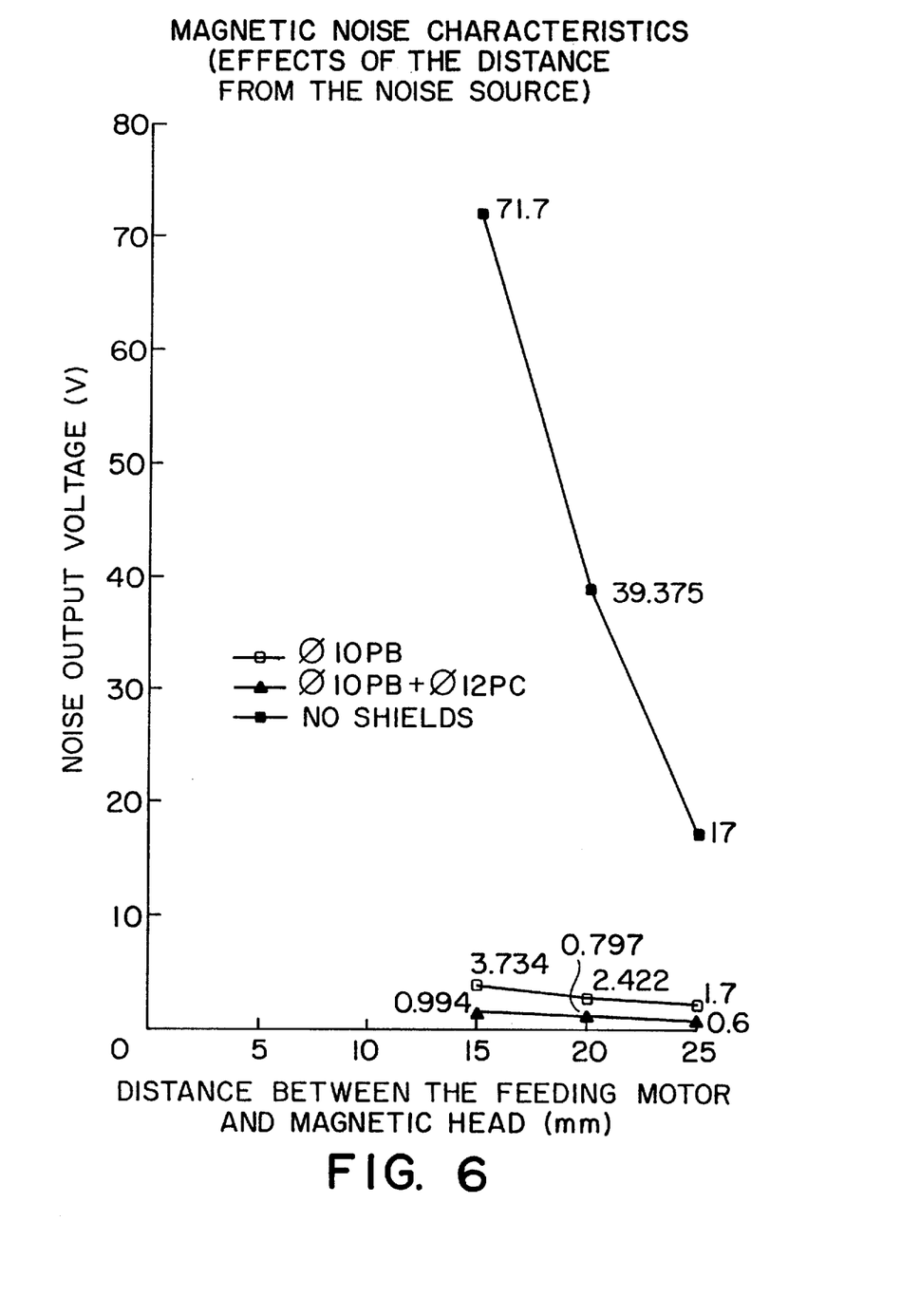
FIG. 6 is a graph showing a result of measuring noise caused by the leaked magnetic flux in accordance with embodiments of the present invention.

FIG. 6 is a graph showing a result of measuring the noise caused by leaked magnetic flux in accordance with embodiments of the present invention. As shown in FIG. 6, the noise caused by leaked magnetic flux can be more substantially reduced even with a motor housing case 6 that shields the drive motor 20 with only one type of material, as described with respect to the first embodiment of the invention, than those that do not provide the shield. Also, as described with reference to the second embodiment of the invention, the noise caused by leaked magnetic flux can be more effectively shielded to reduce the noise by shielding the drive motor 20 with two types of materials.

In accordance with the embodiments of the present invention described herein, the winding spool 10 is rotated to wind the film 12 by driving the motor 20. However, to rewind the film 12 back into film cartridge 17, a gear train (not shown), which includes a planetary gear and pinion gear 2A of the drive motor 20, is engaged to reverse the drive motor 20, thereby enabling the ability to rewind the film 12 into cartridge 17.

Moreover, in accordance with the embodiments of the present invention described herein, although the motor housing case 6 is preferably made of pure iron and is used as an inner shielding member, another shielding member, separate from the motor housing case 6, may be used to perform the function of the motor housing case 6.

In accordance with embodiments of the present invention described herein, of the magnetic flux leaked from the drive motor 20, the magnetic flux having a strong magnetic field intensity is shielded by the inner shielding member having a high saturated magnetic flux density, while the magnetic flux with a low magnetic field intensity is shielded by the outer shielding member having a high maximum relative permeability. Therefore, the magnetic flux leaked from the drive motor can be shielded regardless of the intensity of the magnetic field. As a result, the magnetic data recorded on the film can be accurately read with no effect caused by the magnetic flux leaked from the drive motor, and without using a thick shielding material, even if the intensity of the magnetic field from the drive motor periodically fluctuates.

Further, in accordance with embodiments of the present invention, it is no longer required to place a magnetic information reading device away from the drive motor, thereby increasing the freedom in designing the camera as well as reducing the size of the camera. Moreover, since the inner shielding member and the outer shielding member are connected to a ground potential, the magnetic noise captured by each shielding member can be effectively dissipated. Furthermore, in accordance with embodiments of the present invention, by using a housing case for the drive motor as an inner shielding member, the configuration of the shielding member an be simplified.

In accordance with the second embodiment of the invention, since the outer shielding member comprises the first shielding member and the second shielding member, the leaked magnetic flux that cannot be shielded by the first shielding member (that is, the magnetic flux with a weak magnetic field intensity that cannot be shielded by the inner shielding member) can be shielded by the second shielding member having a high maximum relative permeability. Thus, in accordance with the second embodiment of the invention, the magnetic flux is more effectively shielded from the drive motor regardless of the intensity of the magnetic field. Moreover, since the first shielding member and the second shielding member are connected to the ground potential, the magnetic noise accumulated in each shielding member can be eliminated.

Further, in accordance with the second embodiment of the present invention, since the first shielding member is provided inside of the winding spool and the second shielding member is provided outside of the winding spool, the configuration of the shielding members can be simplified.

In accordance with embodiments of the present invention, of the magnetic flux leaked from the drive motor, the magnetic flux having a strong magnetic field intensity is shielded by the inner shielding member having a high saturated magnetic flux density under a high magnetic field intensity, while the magnetic flux with a low magnetic field intensity is shielded by the outer shielding member having a high maximum relative permeability as well as a high saturated magnetic flux density under a low magnetic field intensity. Therefore, the magnetic flux leaked from the drive motor can be shielded regardless of the intensity of the magnetic field. As a result, it is possible to accurately read, without the use of thick shielding materials, the magnetic data recorded on the film with no effect caused by the magnetic flux leaked from the drive motor, even if the intensity of the magnetic field from the drive motor periodically fluctuates. Further, the present invention provides the advantages that in designing the camera, it is no longer required to place a magnetic information reading device away from the motor, thereby increasing the freedom in designing the camera as well as reducing the size of the camera. Moreover, since the inner shielding member and the outer shielding member are connected to a ground potential, the magnetic noise captured by each shielding member can be effectively dissipated.

In accordance with embodiments of the invention, since the outer shielding member comprises the first shielding member and the second shielding member, of the leaked magnetic flux that cannot be shielded by the inner shielding member, the magnetic flux with a weak magnetic field intensity that cannot be shielded by the first shielding member can be shielded by the second shielding member having a high maximum relative permeability as well as a high saturated magnetic flux density under a low magnetic field intensity. Thus, the magnetic flux of the drive motor can be effectively shielded, regardless of the intensity of the magnetic field. Moreover, since the first shielding member and the second shielding member are connected to the ground potential, the magnetic noise that is accumulated in each shielding member can be eliminated.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A camera, comprising:
    a cartridge chamber to load a film cartridge which accommodates a magnetically recordable film;
    a winding spool to wind the film;
    a drive motor provided within the winding spool to drive the winding spool;
    a magnetic information reading device to read magnetic information recorded on the film;
    an inner shielding member on a same shaft with a rotation shaft of the drive motor; and
    an outer shielding member on the same shaft with the rotation shaft of the drive motor,
    wherein the saturated magnetic flux density of the inner shielding member is greater than the saturated magnetic flux density of the outer shielding member, and the maximum relative permeability of the outer shielding member is greater than the maximum relative permeability of the inner shielding member, and the inner shielding member and the outer shielding member are connected to a ground potential.

2. A camera as recited in claim 1, wherein the inner shielding member is a housing case for the drive motor, and the outer shielding member comprises permalloy B or permalloy C.

3. A camera as recited in claim 1, wherein the inner shielding member comprises a housing case for the drive motor, and the outer shielding member comprises a first shielding member and a second shielding member outside of the first shielding member,
    and wherein the maximum relative permeability of the second shielding member is greater than the maximum relative permeability of the first shielding member, and the first shielding member and the second shielding member are connected to a ground potential.

4. A camera as recited in claim 3, wherein the first shielding member is provided inside of the winding spool and the second shielding member is provided outside of the winding spool.

5. A camera, comprising:
    a cartridge chamber to load a film cartridge which accommodates a magnetically recordable film;
    a winding spool to wind the film;
    a drive motor provided within said winding spool to drive the winding spool;
    a magnetic information reading device to read the magnetic information recorded on the film;

an inner shielding member on a same shaft with the rotation shaft of the drive motor; and an outer shielding member on the same shaft with the rotation shaft of the drive motor, wherein the saturated magnetic flux density of the inner shielding member under a high intensity magnetic field is greater than the saturated magnetic flux density of the outer shielding member under the high intensity magnetic filed, and the saturated magnetic flux density of the outer shielding member under a low magnetic field intensity is greater than the saturated magnetic flux density of the inner shielding member under a low magnetic field intensity, and the inner shielding member and the outer shielding member are connected to a ground potential.

6. A camera as recited in claim 5, wherein the inner shielding member is a housing case for the drive motor, and the outer shielding member comprises a first shielding member and a second shielding member outside of the first shielding member, and wherein the saturated magnetic flux density of the second shielding member under a low intensity magnetic field is greater than the saturated magnetic flux density of the first shielding member under a low intensity magnetic field, and the first shielding member and the second shielding member are connected to a ground potential.

7. A magnetic flux shielding device, suitable for use in a camera, to shield magnetically recordable film from magnetic flux, comprising:

a winding spool to wind the film;

a drive motor positioned within the winding spool to drive the winding spool;

an inner shielding member to shield the film from magnetic flux generated by the drive motor; and an outer shielding member positioned outside the inner shielding member to shield the film from magnetic flux generated by the drive motor.

8. A magnetic flux shielding device as recited in claim 7, wherein the inner shielding member is a housing case for the drive motor and the outer shielding member is a permalloy material.

9. A magnetic flux shielding device as recited in claim 8, wherein the outer shielding member comprises permalloy B or permalloy C.

10. A magnetic flux shielding device as recited in claim 7, wherein the inner shielding member shields magnetic flux having a strong magnetic field intensity and the outer shielding member shields magnetic flux having a weak magnetic field intensity.

11. A magnetic flux shielding device as recited in claim 7, wherein the inner shielding member comprises pure iron having a high saturated magnetic flux density and the outer shielding member comprises a permalloy material having a high maximum relative permeability.

12. A magnetic flux shielding device as recited in claim 7, wherein the inner shielding member has a saturated magnetic flux density greater than the saturated magnetic flux density of the outer shielding member, and the outer shielding member has a maximum relative permeability greater than the maximum relative permeability of the inner shielding member.

13. A magnetic flux shielding device as recited in claim 7, wherein the inner shielding member comprises a housing case for the drive motor, and the outer shielding member comprises a first shielding member and a second shielding member outside the first shielding member, and the second shielding member has a maximum relative permeability greater than a maximum relative permeability of the first shielding member.

14. A magnetic flux shielding device as recited in claim 7, wherein the inner shielding member and the outer shielding member are connected to a ground potential.

15. A magnetic flux shielding device as recited in claim 13, wherein the first shielding member and the second shielding member are connected to a ground potential.

16. A magnetic flux shielding device as recited in claim 7, wherein the saturated magnetic flux density of the inner shielding member under a high intensity magnetic field is greater than the saturated magnetic flux density of the outer shielding member under a high intensity magnetic field, and the saturated magnetic flux density of the outer shielding member under a low intensity magnetic field is greater than the saturated magnetic flux density of the inner shielding member under a low intensity magnetic field.

17. A magnetic flux shielding device as recited in claim 16, wherein the inner shielding member is a housing case for the drive motor, and the outer shielding member comprises a first shielding member and a second shielding member outside of the first shielding member, wherein the saturated magnetic flux density of the second shielding member under a low intensity magnetic field is greater than the saturated magnetic flux density of the first shielding member under a low intensity magnetic field.

18. A magnetic flux shielding device as recited in claim 7, further comprising:

a cartridge chamber to load a film cartridge which accommodates magnetically recordable film; and a magnetic information reading device positioned adjacent the cartridge chamber to read magnetic information recorded on the film.

19. A magnetic flux shielding device as recited in claim 17, wherein the first shielding member and the second shielding member are connected to a ground potential.

\* \* \* \* \*

UNITED STATES PATENT AND TRADEMARK OFFICE
CERTIFICATE OF CORRECTION

PATENT NO. : 5,857,123
DATED : January 5, 1999
INVENTOR(S) : Hidenori Miyamoto et al.

It is certified that error appears in the above-identified patent and that said Letters Patent is hereby corrected as shown below:

Column 11, line 9(claim 5), change "filed" to --field--.

Signed and Sealed this

Twenty-ninth Day of June, 1999

Attest:

Q. TODD DICKINSON

*Attesting Officer*  *Acting Commissioner of Patents and Trademarks*